(12) United States Patent
Graca

(10) Patent No.: US 6,813,836 B2
(45) Date of Patent: Nov. 9, 2004

(54) MULTI-DIRECTIONAL CUTTING TOOL

(76) Inventor: Andrzej Graca, 6210 N. Tripp, Chicago, IL (US) 60646

( * ) Notice: Subject to any disclaimer, the term of this patent is extended or adjusted under 35 U.S.C. 154(b) by 38 days.

(21) Appl. No.: 10/185,227

(22) Filed: Jun. 28, 2002

(65) Prior Publication Data

US 2004/0000057 A1 Jan. 1, 2004

(51) Int. Cl.$^7$ ............................................... B26B 13/06
(52) U.S. Cl. .......................................... 30/259; 30/251
(58) Field of Search .......................... 30/229, 251, 254, 30/257, 258, 259

(56) References Cited

U.S. PATENT DOCUMENTS

| | | | | |
|---|---|---|---|---|
| 4,462,157 A | | 7/1984 | Aiken | 30/259 |
| 4,502,222 A | * | 3/1985 | Sargent | 30/251 |
| 4,967,475 A | * | 11/1990 | O'Keeffe et al. | 30/252 |
| 5,074,046 A | * | 12/1991 | Kolesky | 30/259 |
| 5,636,443 A | | 6/1997 | Linden | 30/134 |

OTHER PUBLICATIONS

American Tool Web Page: Trusted Brands. Trusted Tools. Cut: Right and Straight, Grip Color: Green. Cut: Left and Straight, Grip Color: Red; Cut: Straight and Wide Curves, Grip Color: Yellow; Cut: Notch and Trim—Bulldog Snip, Grip Color: Red; Cut: Straight, Angles, Curves, Left; Grip Color: Red; Cut: Straight and Tight Curves: Cut Straight and Curves, Grip Color: Yellow.

Prosnip Web Page: Tools with a Clear–Cut Difference.

Malco Web Page: Max 2000 Aviation Snip.

Malco Web Page: Andy 14" aluminum Handled Snip.

* cited by examiner

*Primary Examiner*—Hwei-Siu Payer
(74) *Attorney, Agent, or Firm*—Greer, Burns & Crain, Ltd.

(57) ABSTRACT

A tool for cutting rigid sheet material comprises a first shearing member having a first cutting edge; a second shearing member pivotally connected at one end to the first shearing member, the second shearing member have a second cutting edge engaged with the first cutting edge; and a pair of handles operatively connected to the shearing members for pivotally moving the shearing member relative to one another. The first shearing member is preferably a twisted, U-shaped member having two legs, with the second shearing member mounted between the legs. An opening or slot is provided above the second shearing member to accommodate movement of sheet material over both the first and second shearing members. The tool cuts both left and right curves and straight lines in rigid materials such as sheet metal.

17 Claims, 4 Drawing Sheets

MULTI-DIRECTIONAL CUTTING TOOL

FIELD OF THE INVENTION

The present disclosure is directed to cutting tools and more particularly to snips and shears for cutting sheet metal and other stiff or rigid sheet materials.

BACKGROUND OF THE INVENTION

Conventional sheet metal snips, commonly known as aviation snips, comprise pivotally connected lower and upper blades, and a pair of handles connected to the blades in a manner to maximize mechanical leverage. When cutting sheet material, the blades are orientated to cut perpendicularly to the sheet material. The lower blade is on one side of the sheet, e.g., underneath, while the upper blade is on the other side of the sheet, e.g., on top.

Conventional snips are designed to cut either left or right curves. With left snips, the lower blade is on the left side, in the user's direction of cutting. In right snips, the lower blade is on the right side. By industry custom left snips have red handles and right snips have green handles. It is difficult, cumbersome and at many times impossible to cut a curve to the left with right snips or to cut right curves with left snips because of interference between the sheet material and the tool. For example, if one attempts to cut a curve to the right with left snips, the left portion of the freshly cut sheet material will move upwardly into interfering contact with the upper blade, the handles and the user's hand. In addition to left and right snips, there are commercially available straight snips (yellow handles) and various specialty snips.

Sheet metal work necessarily requires use of multiple snips, which adds capital cost to sheet metal work. Sheet metal cutting jobs commonly require workers to frequently switch between left and right snips, which is inefficient. One pair of snips often times becomes misplaced or hidden under scrap metal, resulting in further inefficiency.

SUMMARY OF THE INVENTION

The tool of the present invention provides for multi-directional cutting of sheet metal and other stiff or rigid sheet materials. The tool can be used to cut left curves, right curves and straight lines. The tool of the invention may be used to cut continuous serpentine curves and irregular patterns without changing tools.

In a basic embodiment, the multi-directional cutting tool of the invention comprises a first shearing member, a second shearing member pivotally connected at one end to the first shearing member, the second shearing member having an opening adjacent the pivot point, and a mechanism connected to the first and second shearing members for pivotally moving the second shearing member relative to said first shearing member. The opening adjacent the one end where the pivotal connection is made, allows sheet material that has been cut to slide over both shearing members. Thereby, either left or right curves may be made.

In a preferred embodiment of the tool of the invention, a first shearing member comprises a substantially horizontally disposed U-shaped member having a first leg and a substantially parallel second leg, at least one of the legs inclined from the horizontal. The first leg has a first cutting edge. A second shearing member comprises a substantially vertically disposed V-shaped shearing member having two arms. An end of a first one of the arms is pivotally mounted to the U-shaped member at the base of the U, in between the first and second legs. The first arm extends in a forward direction parallel to the first leg of the U-shaped member. The second arm of the V-shaped shearing member extends upwardly and rearward from the opposite end of the first arm. The first arm of the shearing member has a second cutting edge which engages the first cutting edge on the U-shaped member. A substantially vertical plate is connected to the second leg of the U-shaped member parallel to and on the side of the V-shaped member opposite the second cutting edge. The vertical plate has a substantially horizontal slot above the U-shaped member and horizontally disposed between the arms of the V-shaped member. The V-shaped shearing member is slideably mounted to the vertical plate. A pair of handles is provided. One of the handles is connected to an upper portion of the vertical plate, and the other handle is operatively connected to an upper portion of the second arm of the V-shaped shearing member. Thereby the handles are spaced above the U-shaped member. The handles operate to pivotally move the shearing members between a first position in which the second cutting edge is in a closed mating position relative to the first cutting edge, and a second position wherein the second cutting edge is in an open position.

The preferred embodiment of the invention may be operated to cut both left and right curves. A preferred method for cutting a curved pattern in a horizontally disposed piece of sheet material is as follows. The tool is positioned with open jaws so that an edge of the sheet material is in between the first and second cutting edges. The handles are operated to pivotally move the shearing members while advancing the tool to cut the sheet material into left and right portions. While cutting, one freshly cut portion (i.e., the portion adjacent the second leg of the U-shaped member) is slid under the U-shaped member, while the other portion (i.e., the portion adjacent the first leg) is slid over the U-shaped member. A curve in the direction of the first leg will result in the U-shaped member sliding over the larger, acutely hooked portion of the freshly cut material. This portion will not interfere with further cutting. A curve in the other direction will cause the sheet material on the side adjacent the first leg to slide over the first arm of the V-shaped member, in between the two arms and through the opening in the vertical plate. As a result, this portion of freshly cut material slides freely over the U-shaped plate and does not interfere with further cutting. Accordingly, the tool may be advanced as desired to cut either left or right curves.

Reference herein to the horizontal and vertical, left and right, up and down, directions is intended to provide a frame of reference and the convey the relative orientation of parts, and should not be construed as limitations on the scope of the invention. The cutting tool of the invention will operate at any angle and even inverted.

Other attributes and benefits of the present invention will become apparent from the following detailed specification when read in conjunction with the accompanying drawings.

DETAILED DESCRIPTION OF A PREFERRED EMBODIMENT

Turning to the drawings, FIGS. 1–4 illustrate one preferred embodiment, indicated generally at 10, of the multi-directional snips of the invention. The embodiment 10 is merely illustrative and additional embodiments may be constructed without departing from the scope of the invention as defined by the appended claims. The snips 10 comprise a first shearing member 12, a second shearing member 18 pivotally connected to the first shearing member, and a mechanism, indicated generally at 20, for pivotally moving the second shearing member relative to the first shearing member.

Figure 1:
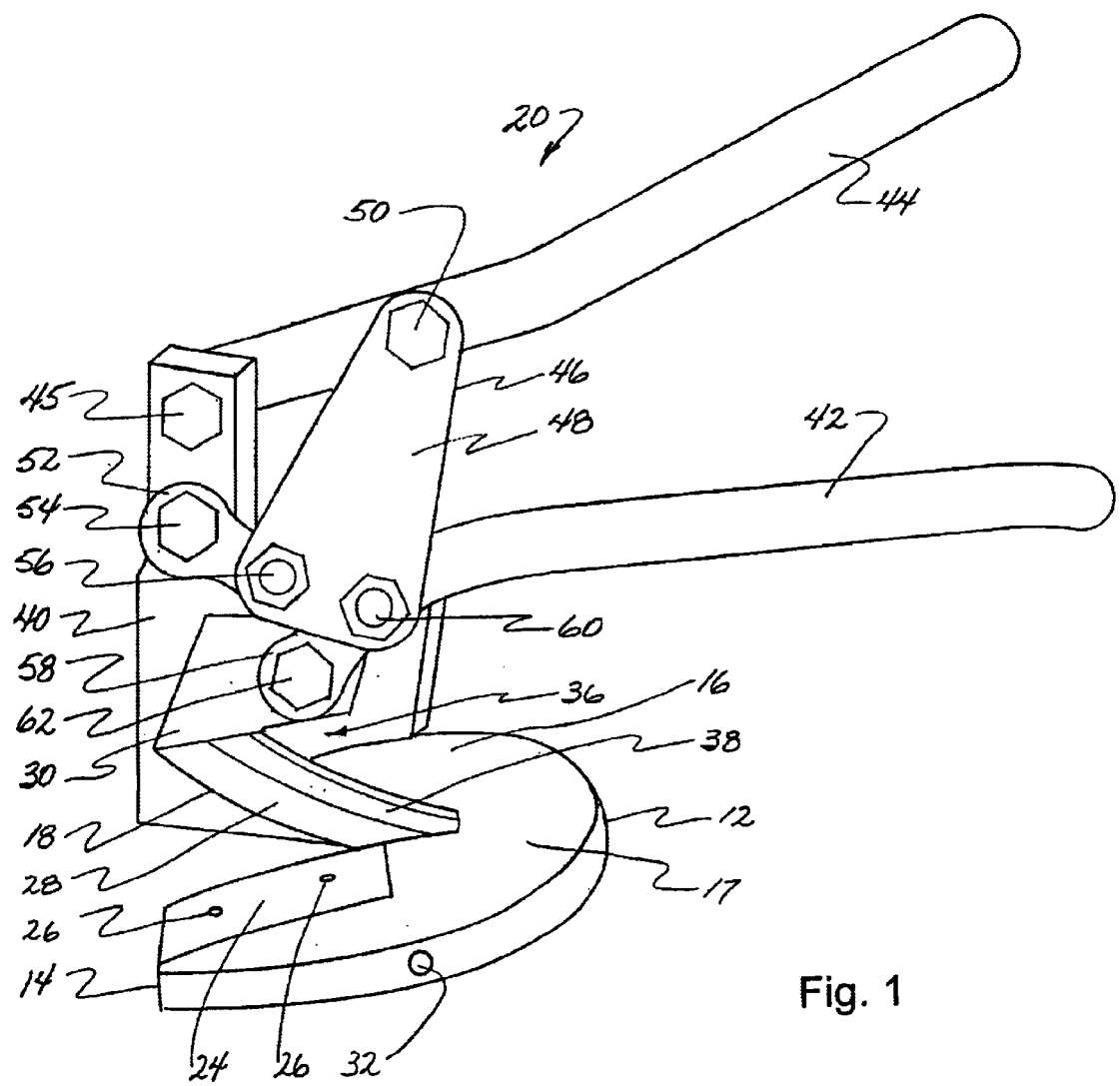
FIG. 1 is left side perspective view of a preferred embodiment of the multi-directional cutting tool of the invention.
Figure 2:
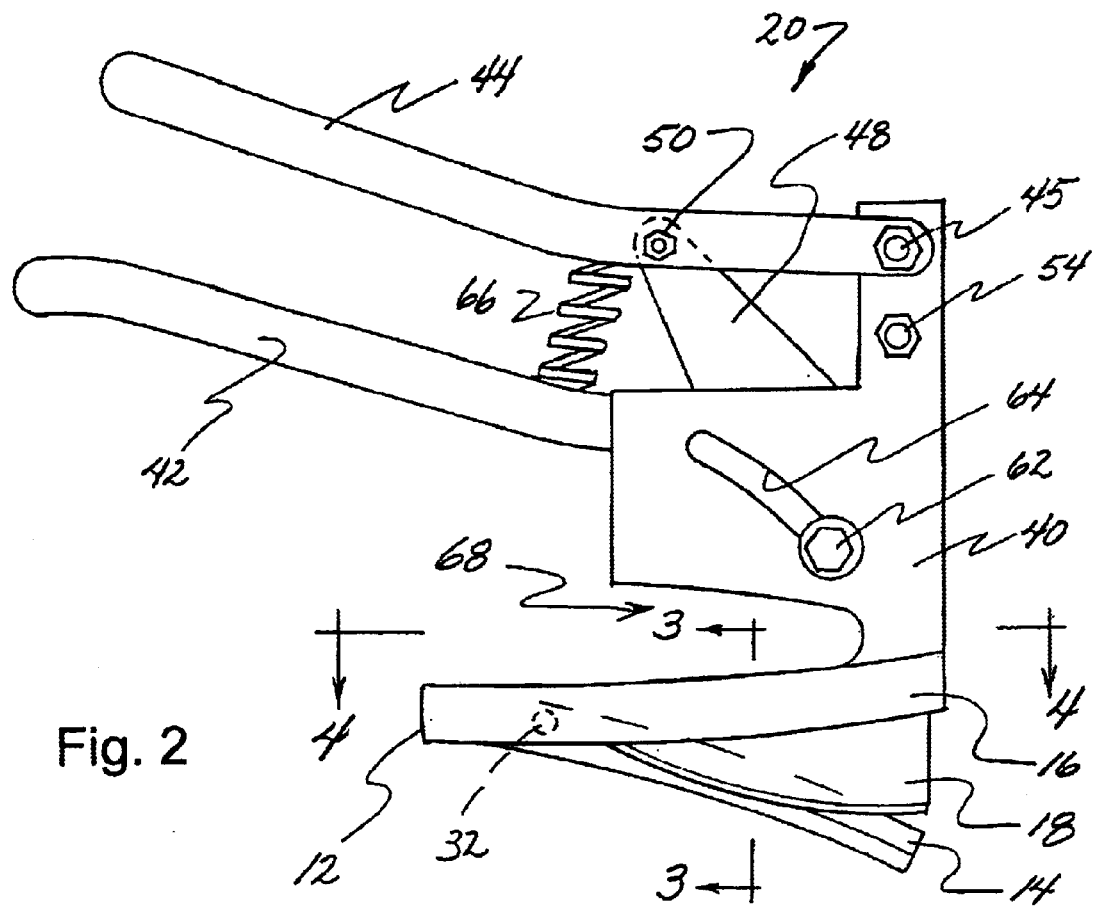
FIG. 2 is a right side elevational view of the preferred embodiment.
Figure 3:
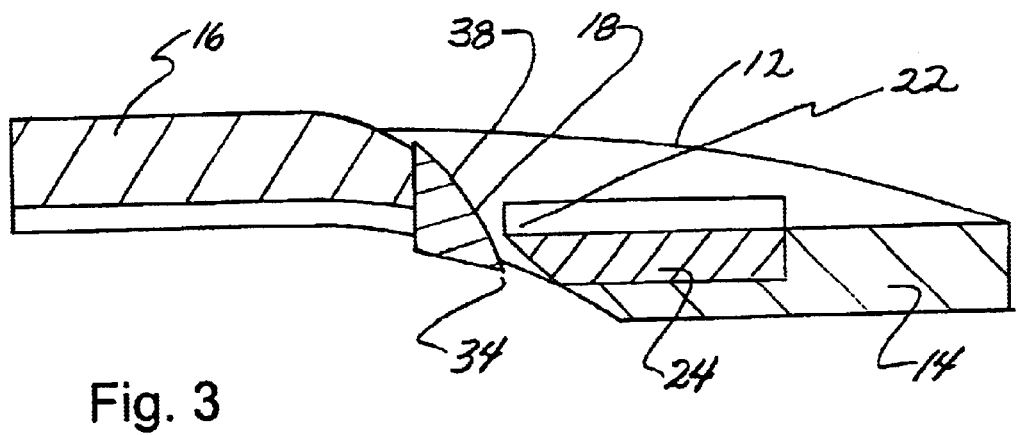
FIG. 3 is a cross-sectional view taken along line 3—3 of FIG. 2.

The first shearing member 12 is generally horizontally disposed, twisted U-shaped plate having legs 14 and 16. At least one of the legs is inclined relative to a generally horizontal plane of the plate. In the illustrated embodiment, leg 14 is inclined in a downward direction, and leg 16 is inclined at a slightly upward direction, as best seen in FIG. 2. The first shearing plate has a machined first shearing edge 22. The edge may be provided directly on the first shearing member, or can be provided on a first shear plate 24 that is fastened to the first shearing member as shown. Shear plate 24 may be fastened in any manner to the member, for example, by use of screws 26. The first shearing member is preferably fabricated from steel plate.

In the illustrated preferred embodiment 10, the first leg 14 is on the left side and the second leg 16 is on the right side of the first shearing member, when viewed in the direction of cutting. However, the elements could be reversed, with the first leg on the right and the second leg on the left. Further, whereas in embodiment 10 the first leg slopes downwardly from the plane of plate 12, it alternatively could be upwardly inclined or coincident with or parallel to the general plane of plate 12. However, if leg 12 is not inclined, then it is necessary for leg 16 to be inclined. In embodiment 10, the second leg 16 is shown as having a slight upward incline. However, leg 16 is not required to be inclined, or alternatively could be inclined at a greater angle. It is only necessary the legs 12 and 14 have a different degree of inclination relative to one another. Further, reference to the "horizontal" plane of the plate is merely for description, and it should be understood that the tool of the invention will operate at any angle of orientation.

Second shearing member 18 is preferably a V-shaped member having plural arms, including a first arm 28 and a second arm 30. An end of the first arm 28 is pivotally connected to the first shearing member between legs 14, 16. The pivot point is at an interior location of the U-shaped first shearing member. The pivotal connection may be made in any manner, for example, by a pivot pin 32. The second arm 30 is operatively connected to the mechanism 20 for pivotally moving the second shearing member relative to the first shearing member. The first arm of the second shearing member is an elongated member provided with a second cutting edge 34. The second cutting edge 34 is positioned to engage the first cutting edge 22. Preferably, both cutting edges 22, 34 are provided with suitable lands to improve cutting. A slot or opening 36 between the first and second arms 28, 30 is provided to accommodate movement of sheet material as it is being cut, as described in detail below. The slot or opening 36 is proximate to the pivot 32 and extends in a forward direction to the base of the "V." The first arm 28 is preferably provided with one or more bevels 38 parallel to the second cutting edge to facilitate movement of the sheet material through the slot or opening 36.

The second shearing member 18 is shown in embodiment 10 as being V-shaped. Whereas this is a preferred shape, the second shearing member could have alternate shapes, provided that one end is pivotally mounted to the first shearing plate and that a slot or opening is provided adjacent the point of pivotal connection and a short distance above the second cutting edge to accommodate the movement of sheet material as it is being cut.

The details of the mechanism for pivotally moving the second shearing member relative to the first shearing member is not important to this disclosure, and many alternative mechanisms are known or will be apparent to persons skilled in the art. The mechanism may be mechanical or electro-mechanical, manual or powered. Suitable mechanisms may be powered electrically or hydraulically. Further, the mechanism can be bench mounted, whereby sheet material is fed to a stationary cutting tool. Preferably, however, the cutting tool is a hand tool and the mechanism comprises a pair of handles. For purposes of this disclosure, a mechanical, hand operated driving mechanism 20 is shown and described. However, the invention as defined by the appended claims is not limited to the mechanism 20 that shown and described herein.

Driving mechanism 20 comprises a support or stabilizing plate 40 connected to the first shearing member 12, a first handle 42 connected to the support plate 40, a second handle 44 pivotally connected by bolt 45 to support plate 40, and linkage 46 operatively connecting second handle 44 to the second shearing member 18. Linkage 46 comprises a first link 48 pivotally connected by bolt 50 to second handle 44; a second link 52 pivotally connected by bolt 54 to the support plate 40 and pivotally connected by bolt 56 to the first link 48; and a third link 58 pivotally connected by bolt 60 to the first link 48. A bolt 62 pivotally connects third link 58 to the second shearing member 18. Bolt 62 also passes through slot 64 in support plate 40. A spring 66 is preferably provided between handles 42, 44 to bias the handles apart from one another. When handles 42, 44 are pressed towards one another, link 48 moves downwardly, urging link 58 downwardly, which in turn, pivotally moves the forward end of the second shearing member towards the first shearing member.

One function of support plate 40 is to support the second shearing member 18 and maintain proper alignment of the shearing member while cutting sheet material. The second arm 30 of shearing member 18 is flush with and slides against the surface of plate 40. Bolt 62 holds the shearing member against the support plate allowing for a sliding relative movement. It is desirable to lubricate this interface. When the second shearing member is pivotally moved, bolt 52 slides in arcuate slot 64. The ends of slot 64 provide limits or stops on the travel of second shearing member 18. A slot or opening 68 is provided in support plate 40 to accommodate sheet material movement. Slot 68 is horizontally juxtaposed with slot 36 in second shearing member 18.

The cutting tool may be made of any suitable rigid, durable material as is well known to those skilled in the tool making art. The first and second shearing members are preferably fabricated from steel. The members must be engineered to appropriate size and strength to cut the desired material. The driving mechanism can also be fabricated from steel, but alternatively could be made from another material such as aluminum. The bolts are preferably steel.

Figure 5:
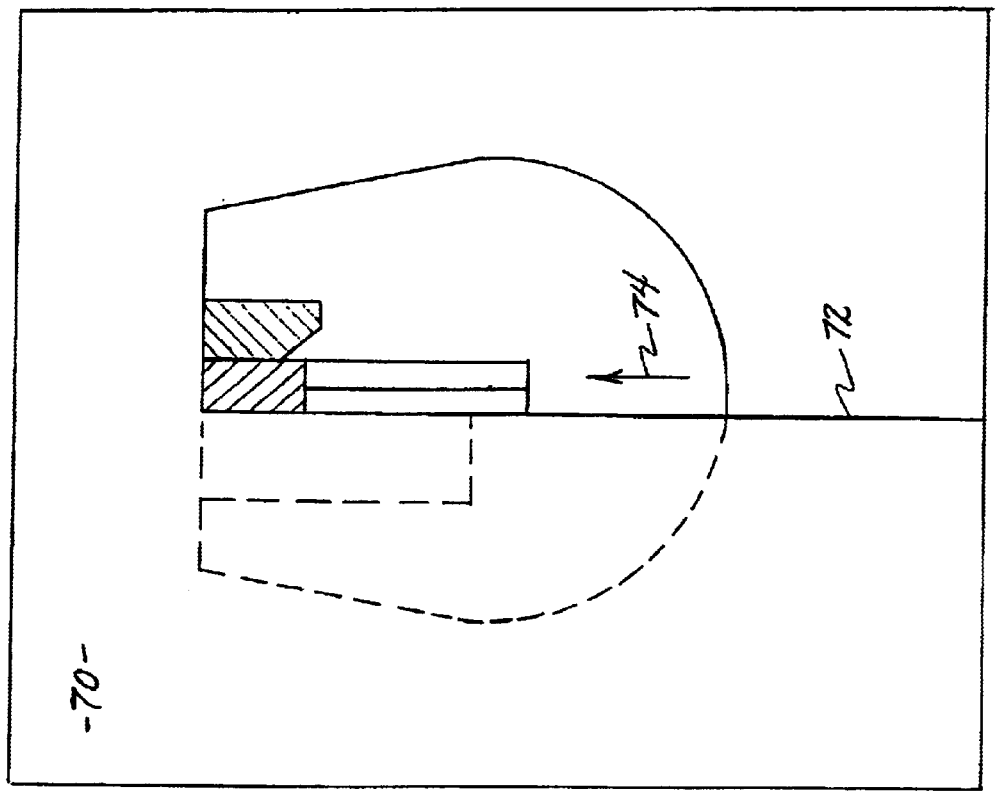
FIG. 5 is a cross-sectional view as in FIG. 4 showing a straight cut on a piece of sheet material.
Figure 4:
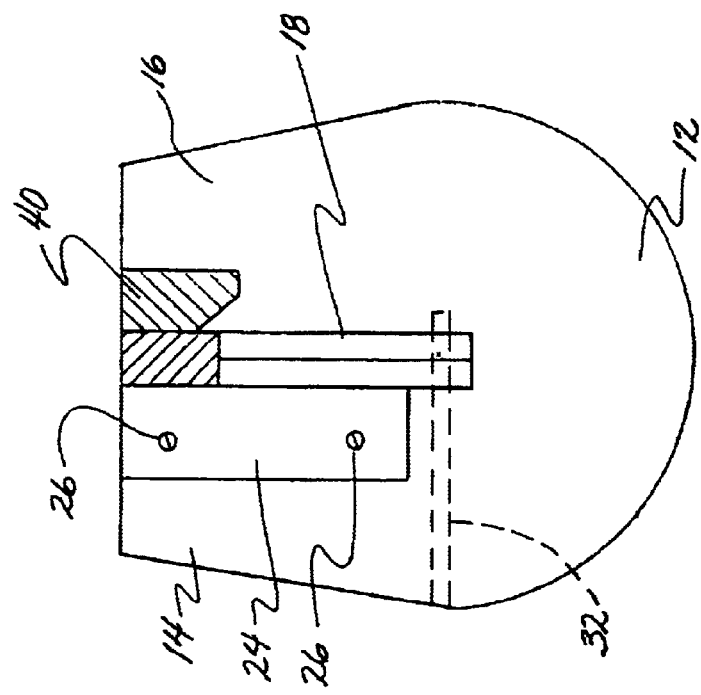
FIG. 4 is a cross-sectional view taken along line 4—4 of FIG. 2.
Figure 7:
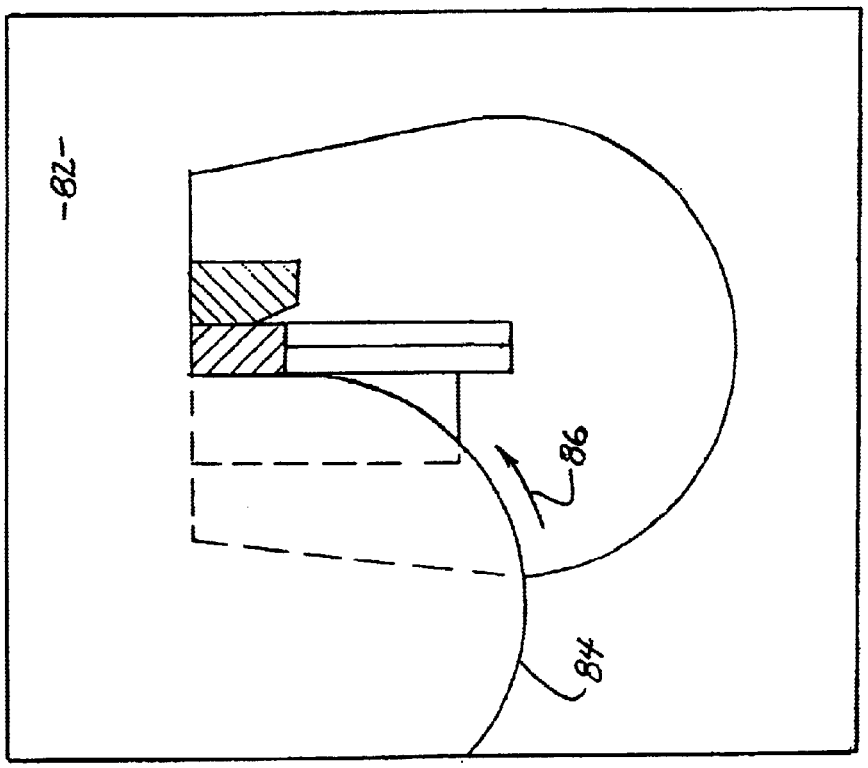
FIG. 7 is a cross-sectional view as in FIG. 4 showing a left curve cut on a piece of sheet material.
Figure 6:
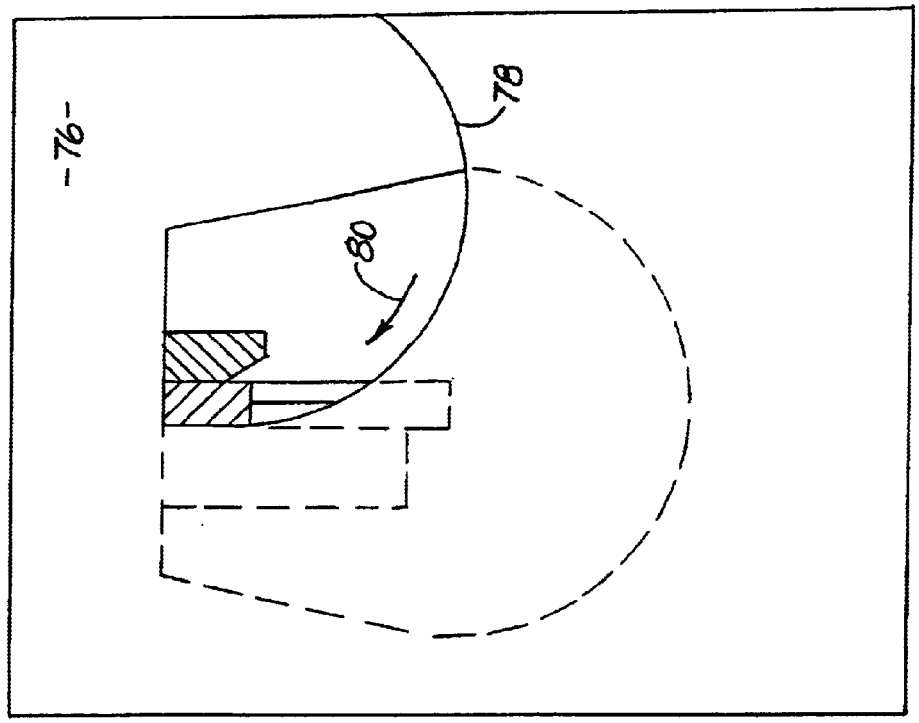
FIG. 6 is a cross-sectional view as in FIG. 4 showing a right curve cut on a piece of sheet material.

FIGS. 5–7 show the preferred embodiment of the tool of the invention cutting a piece of stiff or rigid sheet material. FIG. 5 illustrates a straight cut 72 being made in sheet 70. The tool and cut are advancing in the direction of arrow 74. A left portion of the freshly cut sheet rides up inclined leg 14 while the right portion is directed under member 12 by leg 16.

FIG. 6 illustrates cutting a right curve 78 in sheet material 76. As in FIG. 5, the left portion of the material is directed by first leg 14 to slide upwardly over the top of U-shaped member 12, whereas the right portion of newly cut material is directed by the second leg 16 to slide under member 12. As the tool is advanced by the user to right, the newly cut left portion of the material slides over the top of the first arm 28 of second shearing member 18. Beveled surface 38 facilitates the smooth movement over arm 28. The left portion of the material slides though opening or slot 36 between arms 28, 30 and through the opening or slot 68 in plate 40.

FIG. 7 illustrates a left curve 84 being cut in sheet 82 in the direction of arrow 86. As with FIGS. 5 and 6, the left portion of the material is guided up and over the U-shaped member, while the right portion slides under the U-shaped member.

With left, right and straight cuts, the handles or other driving mechanism are at all times spaced a suitable distance above the sheet, and as a result the cut portions of the sheet material do not interfere with the driving mechanism. Significantly, the worker's hand that operates the tool is spaced a distance away from the edges of the freshly cut material, reducing the potential for cuts and other injuries. Further, because both handles are spaced above the sheet material, very long cuts may be made. Minimal bending of sheet takes place as the U-shaped member glides through the material. Cuts left, right and straight may be made while continuously cutting, without any need to change tools or reposition the tool. Cuts at nearly any radius of curvature can be made. Curves of radii of less than three inches are possible.

While preferred embodiments of the apparatus and method of operation of the present invention have been shown and described, it is to be understood that the invention is not limited to the embodiments disclosed and that modifications and changes could be made thereto without departing from the scope of the invention as defined by the appended claims. Further, as indicated above, references herein to the horizontal and vertical, left and right, up and down, forward and back, directions are intended to provide a frame of reference and the convey the relative orientation of parts, and should not be construed as limitations on the scope of the invention. The tool of the invention will operate at any angle of orientation.

What is claimed is:

1. A tool for cutting rigid sheet material comprising
   a U-shaped member having a first leg and a substantially parallel second leg, at least one of said legs being inclined relative to the other of said legs, said first leg having a first cutting edge;
   a V-shaped shearing member, an end of a first arm of said V-shaped member pivotally mounted to said U-shaped member in between said first an said second legs, said V-shaped member being substantially perpendicular to said U-shaped member, said first arm of said V-shaped member having a second cutting edge, said V-shaped member having a second arm and an opening between said first and second arms;
   a support plate connected to said second leg of said U-shaped member, and parallel to said V-shaped member, said support plate having a slot adjacent said U-shaped member and aligned with said opening between said first and second arms of said V-shaped member, said V-shaped member slideably mounted to said support plate; and
   a pair of handles, one of said handles connected to said support plate, and the other of said handles operatively connected to said V-shaped member for pivotally moving said V-shaped member between a first position in which said second cutting edge is in a closed mating position relative to said first cutting edge, and a second position wherein said second cutting edge is in an open position relative to said first cutting edge.

2. A tool as in claim 1, wherein said handled are spaced from said U-shaped member.

3. A tool as in claim 1, wherein said first arm of said V-shaped member has at least one bevel adjacent said opening between said first and second arms.

4. A tool for cutting sheet material comprising
   a twisted plate having a slot extending at one end from an interior point of said plate to an edge of said plate, said plate have a first cutting edge adjacent said slot;
   an elongated member having first and second ends, a first end of said member pivotally mounted to said twisted plate within said slot proximate to said interior point of said twisted plate, said member having a second cutting edge engaged with said first cutting edge; and
   means operatively connected to the second end of said elongated member for pivotally moving said elongated member relative to said twisted plate.

5. A tool as in claim 4, wherein a portion of said twisted plate on one side of said slot is inclined relative to a portion of said twisted plate on the other side of said slot.

6. A tool as in claim 4, wherein said elongated member has at least one bevel on said elongated member adjacent said second cutting edge.

7. A tool as in claim 4, further comprising a support plate connected to and extending from said twisted plate parallel to said elongated member, and wherein said pivotally moving means comprises a pair of handles, one handle attached to said support plate, and the other of said handles attached to the second end of said elongated member.

8. A tool for cutting rigid sheet material, comprising
   a first shearing member having a first cutting edge;
   a second shearing member having a pivotal connection at one end with said first shearing member, said second shearing member having a second cutting edge engaged with said first cutting edge, said second shearing member having an opening forward of said pivotal connection and extending over and rearward of said pivotal connection and adapted to allow a portion of the rigid sheet material to slide over said pivotal connection; and
   means operatively connected to said first shearing member and said second shearing member for pivotally moving said second shearing member relative to said first shearing member.

9. A tool as in claim 8, wherein said first shearing member comprises a U-shaped plate having plural legs, at least one of said legs being inclined relative a second of said legs, said second shearing member being located between said legs.

10. A tool as in claim 9, wherein said one leg is downwardly inclined relative to said second leg, and said downwardly inclined leg carries said first cutting edge.

11. A tool as in claim 9, further comprising a shear plate removably attached said first shearing member, said first cutting edge being on said shear plate.

12. A tool as in claim 8, wherein said second shearing member comprises a generally V-shaped member have two arms, said pivotal connection being made at the end of one of said arms, and said second cutting edge being carried by said one arm, and said opening being defined between said arms.

13. A tool as in claim 8, further comprising at least one beveled surface on said second shearing member between said second cutting edge and said opening.

14. A tool as in claim 8, wherein said pivotally moving means comprises a pair of handles, one of said handles connected to said first shearing member and a second of said handles attached to said second shearing member, said handles being spaced apart form said shearing members.

15. A tool as in claim 8, further comprising a stabilizing plate connected to said first shearing member, wherein said second shearing member is slideably mounted to said stabilizing plate.

16. A tool as in claim 8, wherein said shearing member comprises a twisted plate having a slot therein, said second shearing member being mounted in said slot.

17. A tool cutting rigid sheet material, comprising
a substantially planar first shearing member having a first cutting edge;
a second shearing member having a pivotal connection at one end to said first shearing member, said second shearing member having a second cutting edge engaged with first cutting edge;
areas above and below said substantially planar first shearing member rearward of said pivotal connection being substantially unobstructed an adapted to allow cut portions of the rigid sheet material to slide over and under said first shearing member when cutting left or right curves in the rigid sheet material; and
handled operatively linked to said first and second shearing members for pivotally moving said second shearing member relative to said first shearing member.

* * * * *